(12) United States Patent
Dowty

(10) Patent No.: US 6,902,365 B1
(45) Date of Patent: Jun. 7, 2005

(54) QUICK-RELEASE TRACK FASTENER

(75) Inventor: Mark Brian Dowty, Rural Hall, NC (US)

(73) Assignee: B E Aerospace, Inc., Wellington, FL (US)

( * ) Notice: Subject to any disclaimer, the term of this patent is extended or adjusted under 35 U.S.C. 154(b) by 0 days.

(21) Appl. No.: 10/779,061

(22) Filed: Feb. 13, 2004

(51) Int. Cl.[7] .............................................. B60P 7/08
(52) U.S. Cl. ...................... 410/105; 410/104; 410/102; 248/503.1; 244/118.6
(58) Field of Search ..................... 410/102, 104–105, 410/116; 248/503.1, 503; 244/118.1, 118.6, 244/122 R, 137.1

(56) References Cited

U.S. PATENT DOCUMENTS

| | | | |
|---|---|---|---|
| 3,282,229 A | 11/1966 | Elsner | |
| 3,620,171 A | 11/1971 | Brenia et al. | |
| 3,719,156 A | 3/1973 | Broling | |
| 4,026,218 A | 5/1977 | Prete, Jr. et al. | |
| 4,062,298 A | 12/1977 | Weik | |
| 4,230,432 A * | 10/1980 | Howell | 410/102 |
| 4,256,424 A * | 3/1981 | Knox et al. | 410/105 |
| 4,449,875 A * | 5/1984 | Brunelle | 410/80 |
| 4,496,271 A * | 1/1985 | Spinosa et al. | 410/105 |
| 4,509,888 A * | 4/1985 | Sheek | 410/105 |
| 4,708,549 A * | 11/1987 | Jensen | 410/105 |
| 4,776,533 A | 10/1988 | Sheek et al. | |
| 4,932,816 A * | 6/1990 | Ligensa | 410/105 |
| 5,169,091 A | 12/1992 | Beroth | |
| 5,183,313 A | 2/1993 | Cunningham | |
| 5,489,172 A * | 2/1996 | Michler | 410/105 |
| 5,564,654 A | 10/1996 | Nordstrom | |
| 5,765,978 A * | 6/1998 | Looker et al. | 410/105 |
| 5,871,318 A | 2/1999 | Dixon et al. | |
| 6,789,988 B1 * | 9/2004 | Moradians | 410/105 |

* cited by examiner

Primary Examiner—Stephen Gordon
(74) Attorney, Agent, or Firm—Adams Evans P.A.

(57) ABSTRACT

A track fastener assembly for securing a seat or cargo apparatus to a floor track of a vehicle. The assembly includes a base with a longitudinal slot formed therein, and a ramp disposed in its upper surface near the forward end of the slot. A movable slide carrying locking studs runs in the longitudinal slot. A locking rod having a helical groove formed in its outer surface is operatively connected to the base and the slide. Rotation of the locking rod causes the slide to move axially along the longitudinal slot from an installation position near the aft end of the base to a locking position near the forward end of the base. As the slide moves to the locking position, the slide engages the ramp in the base, thereby deflecting the slide with the attached locking studs upwards and clamping the track fastener assembly to the track.

21 Claims, 6 Drawing Sheets

QUICK-RELEASE TRACK FASTENER

TECHNICAL FIELD AND BACKGROUND OF THE INVENTION

This invention relates to a track fastener assembly of the type used to anchor seats or cargo to tracks fitted to the floor of a vehicle. The particular embodiment disclosed herein is of a track fastener assembly for securing an aircraft passenger seating unit to the floor of an aircraft. Therefore the vehicle referred to throughout this application is an aircraft. It is understood that the invention relates as well to other types of vehicles such as trains, buses or the like.

Many aircraft require the capability to be differently configured to meet varying cargo and/or passenger-carrying requirements such as the removal or addition of passenger seats and/or cargo. In addition, aircraft also must have the capability to easily and quickly relocate or reposition seats and/or cargo. It is often necessary in aircraft to change the spacing between seats to increase or decrease the passenger density throughout a portion of or the entire aircraft. For example, it may be necessary to change the passenger density of a particular aircraft from its normal first class and coach density to an all-coach configuration such as might be necessary with charter operations. In addition, some aircraft, particularly those operating on late-night schedules, carry both passengers and cargo, the cargo being carried in one or more compartments normally used to carry passengers. Also driving this design is the need of aircraft manufacturers to speed their initial installation time, which is a major consideration on large aircraft with many seats.

To provide this capability, aircraft manufacturers install locking tracks that run fore and aft along the deck of the major compartments of the aircraft. These locking tracks have a slot that runs the entire length of the track along its top side. Enlarged cut-out openings are spaced at regular intervals along the length of the track to receive portions of various types of track fasteners to permit the track fasteners to be positioned along and locked into the track in order to secure passenger seats and/or cargo pallets which are themselves secured to the track fastener. These track fasteners are adjustable within the track, thereby permitting the seats and/or cargo to be repositioned or removed.

The tracks and track fasteners are designed with safety as a paramount concern. A seat or cargo container which is not securely locked into the track is subject to sudden movement which can cause injury, structural damage to the aircraft or a substantial change in aircraft balance. The track assembly must be able to safely distribute the load to the track so that an load is not transmitted through only a few load distribution points in a manner that would cause an unsafe condition. Any track fastener should also be capable of being easily installed on and removed from the locking track so the seats and/or cargo can be repositioned or removed quickly, safely and with minimal effort.

Some seat units, especially first-class seat units, have become larger and heavier in an effort to incorporate additional passenger features such as complex reclining or sleeping surfaces, in flight entertainment, work surfaces, and heavily padded upholstery. With most of prior art track fasteners, the entire fastener must be moved along with the entire attached seating unit in order to engage it in the locking position of the track. This is difficult with large and heavy seat units. Furthermore, a slight misalignment of the seat tracks or legs can make the seat difficult to move in the tracks, especially in seats having more than two legs.

Accordingly efforts have been made to provide a seat track fastener in which only the locking elements are moved in order to lock the seat to the track, without having to move the entire seat. For example, U.S. Pat. No. 5,489,172 discloses a fastening device in which a locking body which engages a track is moveable relative to the body of the fastening device such that the seat or cargo unit may be locked into place without having to shift it after it is initially positioned. However, this design is operated by a hand lever which protrudes a substantial amount vertically or horizontally from the track fitting, and the motion of the lever must be accommodated in the design of the seat.

Because seat units often have extensive exterior structure or skirting which restricts access to the mounting points, it is desirable to have a track fastener which is easily operated without requiring substantial vertical or horizontal space outside of the volume of the fastener.

SUMMARY OF THE INVENTION

Therefore, it is an object of the invention to provide a track fastener assembly for a vehicle such as an aircraft, train, bus or the like.

It is an object of the invention to provide a track fastener assembly which is quickly and easily locked and unlocked when necessary to reposition the fastener.

It is another object of the invention to provide a track fastener assembly which is capable of being connected to a locking track quickly, safely and securely.

It is another object of the invention to provide a track fastener assembly which does not require repositioning of an attached seat in order to be locked in place.

It is another object of the invention to provide a track fastener assembly which requires a minimal amount of access space to be locked and unlocked.

These and other objects of the present invention are achieved in the preferred embodiments disclosed below by providing a track fastener assembly for use with a locking track of the type used to secure a seat or cargo apparatus to the floor of a vehicle, the upper walls of the locking track defining a longitudinally-extending slot therein, the upper walls of the slot having regularly spaced-apart enlarged openings along the length thereof separated by relatively narrower track segments defining locking segments.

The track fastener assembly includes an elongated base having forward and aft ends and including attachment means for attachment to a seat or cargo apparatus. The base has a longitudinal slot formed therein, at least one ramp disposed on an upper surface of the base adjacent a forward end of the longitudinal slot, and at least one downwardly-protruding track stop for engaging the enlarged openings of the track. A slide is movably attached to the base, the slide including a rail received in the longitudinal slot of the base. A generally horizontally extending locking rod having a helical groove formed in its outer surface is operatively connected to the base and the slide, such that rotation of the locking rod causes the slide and the attached locking studs to move longitudinally from an installation position near the aft end of the base to a locked position spaced away from the aft end of the base. The slide is displaced upwardly by the ramp in the locked position.

According to another embodiment of the invention, the slide includes at least one pin which engages the helical groove of the locking rod for imparting horizontal movement to the slide as the locking rod is rotated.

According to another embodiment of the invention, the locking rod may freely rotate and move vertically with respect to the base, but is restrained laterally and longitudinally relative to the base.

According to another embodiment of the invention, the helical groove is formed in the locking rod to move the slide between the installation position and the locked position in less than 360 degrees of rotation of the locking rod.

According to another embodiment of the invention, an eccentric locking disk is attached to the locking rod, such that rotation of the locking rod causes a peripheral edge of the disk to bear against the base and lift the locking rod and slide away from the base.

According to another embodiment of the invention, the locking disk includes a locking flat disposed on the peripheral edge for engaging a surface of the base, such that rotation of the locking rod is resisted when the locking disk is in the locked position.

According to another embodiment of the invention, the locking flat is positioned such that the locking flat engages the base after approximately 180 degrees of rotation of the locking rod from the installation position.

According to another embodiment of the invention, the rail includes a pair of tapered surfaces flanked by a pair of angled shoulders. The longitudinal slot includes a pair of sidewalls tapered opposite to the tapered surfaces, and a beveled ledge. The angled shoulders mate with the beveled ledge, and a gap is formed between the tapered surfaces and the sidewalls, so as to permit limited rotation of the slide relative to the base.

According to another embodiment of the invention, the helical groove is formed in the locking rod to move the slide between the installation position and the locked position in about 180 degrees of rotation of the locking rod.

According to another embodiment of the invention, a track fastener assembly is provided for use with a locking track of the type used to secure a seat or cargo apparatus to the floor of a vehicle, the upper walls of the locking track defining a longitudinally-extending slot therein, the upper walls of the slot having regularly spaced-apart enlarged openings along the length thereof separated by relatively narrower track segments defining locking segments.

The track fastener assembly includes an elongated base having forward and aft ends and including attachment means for attachment to a seat or cargo apparatus. The base has a longitudinal slot formed therein, at least one ramp disposed on an upper surface of the base adjacent a forward end of the longitudinal slot, and at least one downwardly-protruding track stop for engaging the enlarged openings of the track. A slide is movably attached to the base, the slide including a bottom portion defining a rail which is received in the longitudinal slot of the base, a pair of shoulders adjacent the rail, and an upper surface defining a channel for receiving a locking rod At least one upstanding pin is disposed in the channel, and at least one locking stud having an enlarged head attached to the rail of the slide. A cylindrical locking rod having forward and aft ends and a helical groove formed in its outer surface is received in the channel such that the helical groove engages the pin, and the forward end of the locking rod is rotatably attached to the base.

Rotation of the locking rod causes the slide and the attached locking studs to move axially along the longitudinal slot from an installation position near the aft end of the base to a locked position spaced away from the aft end of the base, and wherein the shoulders of the slide engage the ramps thereby deflecting the slide upwards in the locked position.

According to another embodiment of the invention, the locking rod includes a tool recess formed in the aft end for engaging a tool for rotating the locking rod.

According to another embodiment of the invention, the attachment means include a pair of upstanding spaced-apart bosses having a pair of concentric holes formed therein, the bosses include a pair of flanges defining a vertical slot therebetween.

According to another embodiment of the invention, the locking rod has an annular groove formed at its forward end, the groove being received in the vertical slot between the bosses whereby the locking rod may freely rotate and move vertically with respect to the base, but is restrained laterally and longitudinally relative to the base.

According to another embodiment of the invention, the track stop is a cylindrical protrusion.

According to another embodiment of the invention, the track stop is a semi-cylindrical protrusion.

According to another embodiment of the invention, the helical groove is formed in the locking rod to move the slide between the installation position and the locked position in less than 360 degrees of rotation of the locking rod.

According to another embodiment of the invention, the helical groove is formed in the locking rod to move the slide between the installation position and the locked position in less than 270 degrees of rotation of the locking rod.

According to another embodiment of the invention, the helical groove is formed in the locking rod to move the slide between the installation position and the locked position in approximately 180 degrees of rotation of the locking rod.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
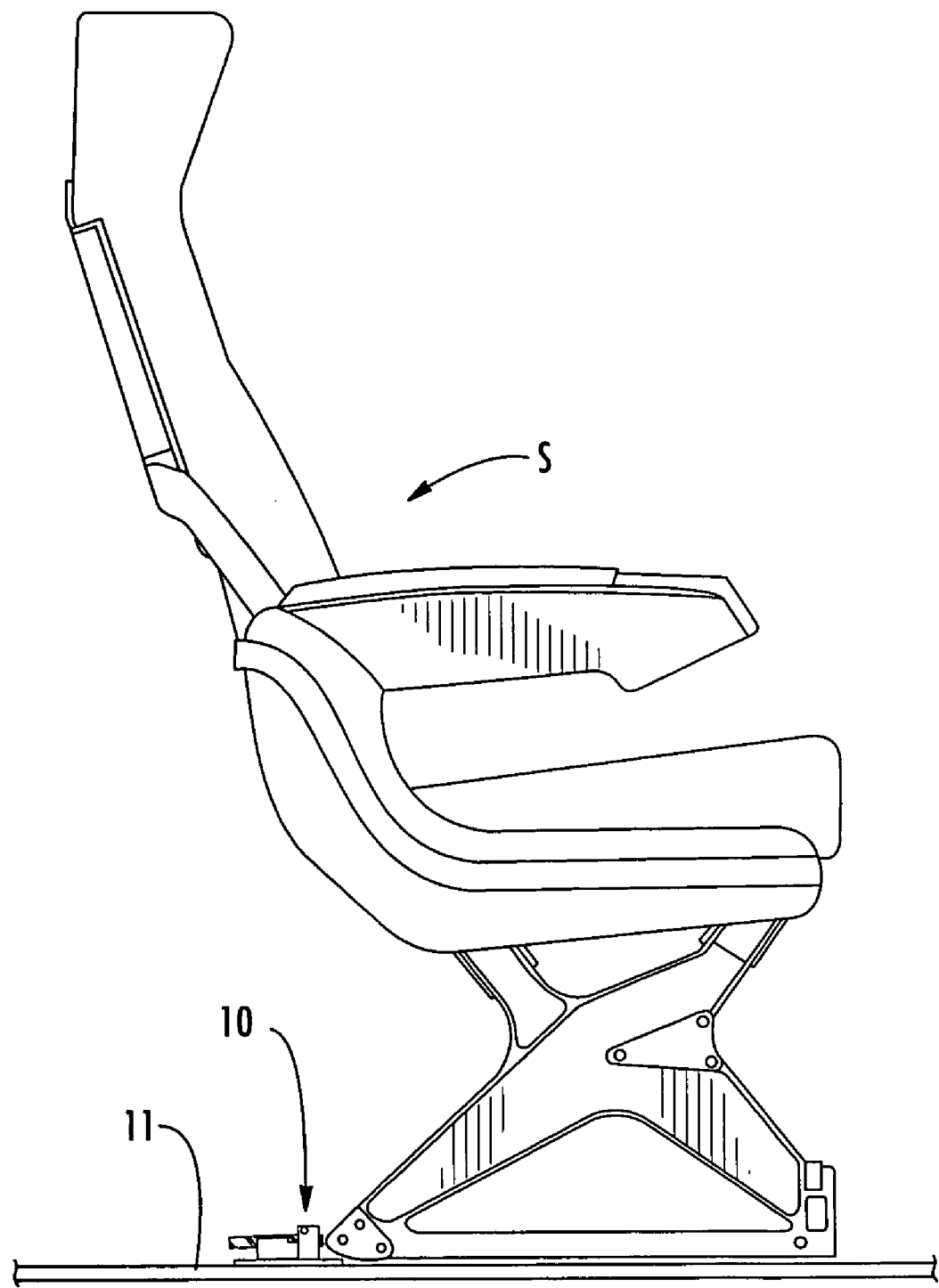
FIG. 1 is a side elevation of a typical aircraft passenger seat attached to a track fastener assembly according to an embodiment of the invention.

Referring now specifically to the drawings wherein identical reference numerals denote the same elements throughout the various views, a typical seating arrangement using the track fastener assembly and track fastener assembly according to the present invention is illustrated in FIG. 1. A seating unit "S" is positioned on a locking track 11 and locked thereto by means of a track fastener assembly 10.

Figure 2:
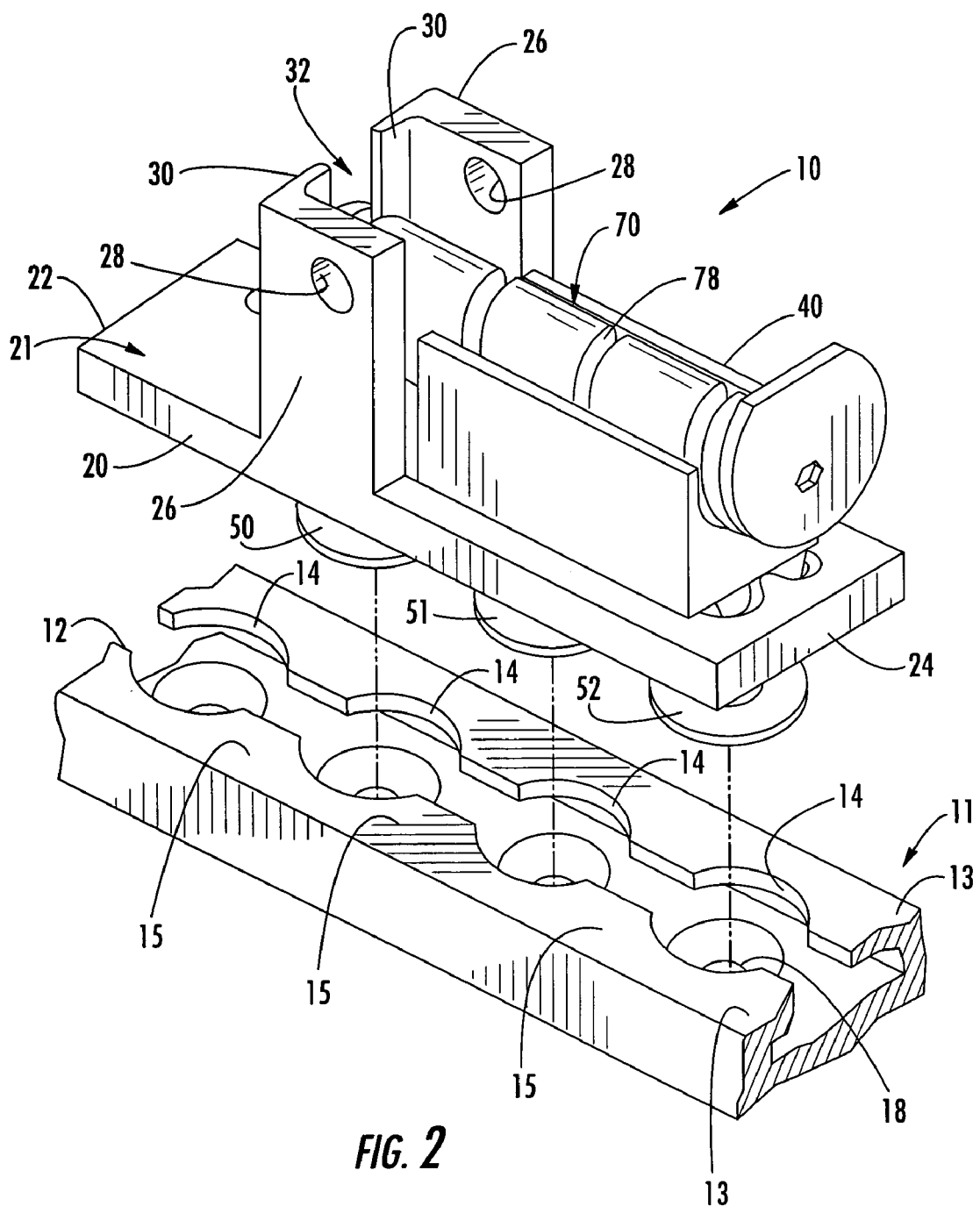
FIG. 2 is a perspective view of a track fastener assembly constructed according to the present invention positioned over a length of locking track of a type usable with the invention.

Referring now to FIG. 2, locking track 11 has a longitudinally-extending slot 12 therein which extends along the entire length of the locking track 11. Upper walls 13 of the locking track 11 define the slot 12 having regularly spaced-apart enlarged openings 14 along the length thereof, separated by relatively narrower track slot segments 15 which form the portions of the structure which actually perform the locking function. In FIG. 2 it is evident that the narrow track slot segments 15 extend into the slot 12 to provide undercut areas in the slot 12 beneath the slot segments 15. In contrast, the enlarged openings 14 have little or no undercut areas in the slot 12. The locking track 11 is attached to the floor of the aircraft, for example by machine screws which pass through screw holes 18 in the bottom of locking track 11.

Referring now to FIGS. 2–5, an exemplary track fastener assembly 10 constructed according to the present invention is shown. The track fastener assembly 10 includes an elongated base 20 with forward and aft ends 22 and 24. It is noted that the terms "forward" and "aft" are used herein merely for the purpose of orientation and that the track fastener assembly 10 may be installed with either of its ends facing forwards relative to the track 11. The base 20 has a pair of upstanding, spaced-apart L-shaped bosses 26. The bosses 26 include integrally-formed attachment means in the form of a pair of aligned apertures 28 (one in each of the bosses 26) for receiving a bolt or other fastener from the seating unit "S" so that the track fastener assembly 10 and the seating unit are securely connected together. The bosses 26 also include spaced-apart vertically extending flanges 30 which define a vertical slot 32 therebetween.

Figure 3:
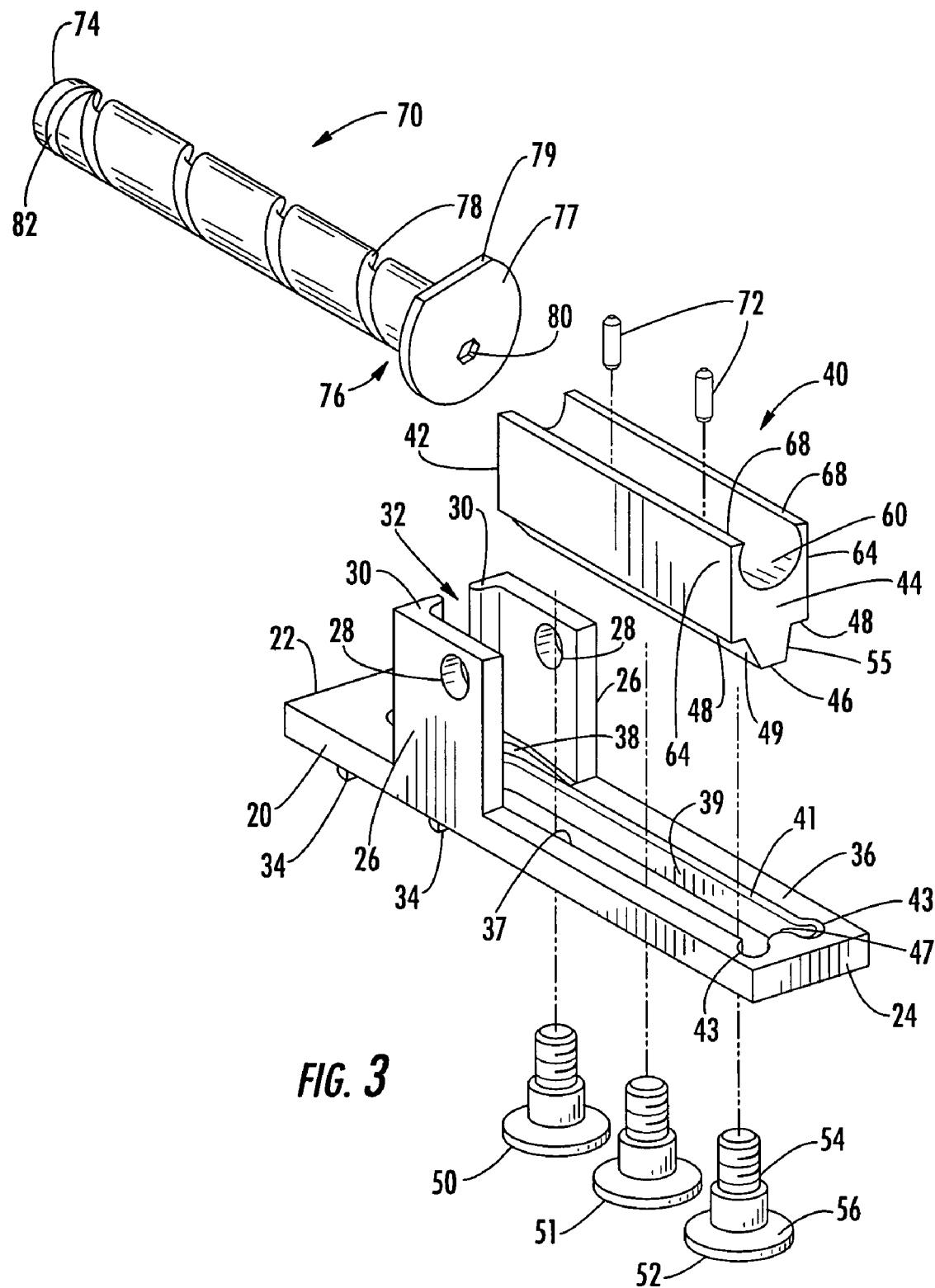
FIG. 3 is an exploded perspective view of the track fastener assembly of FIG. 2.
Figure 4:
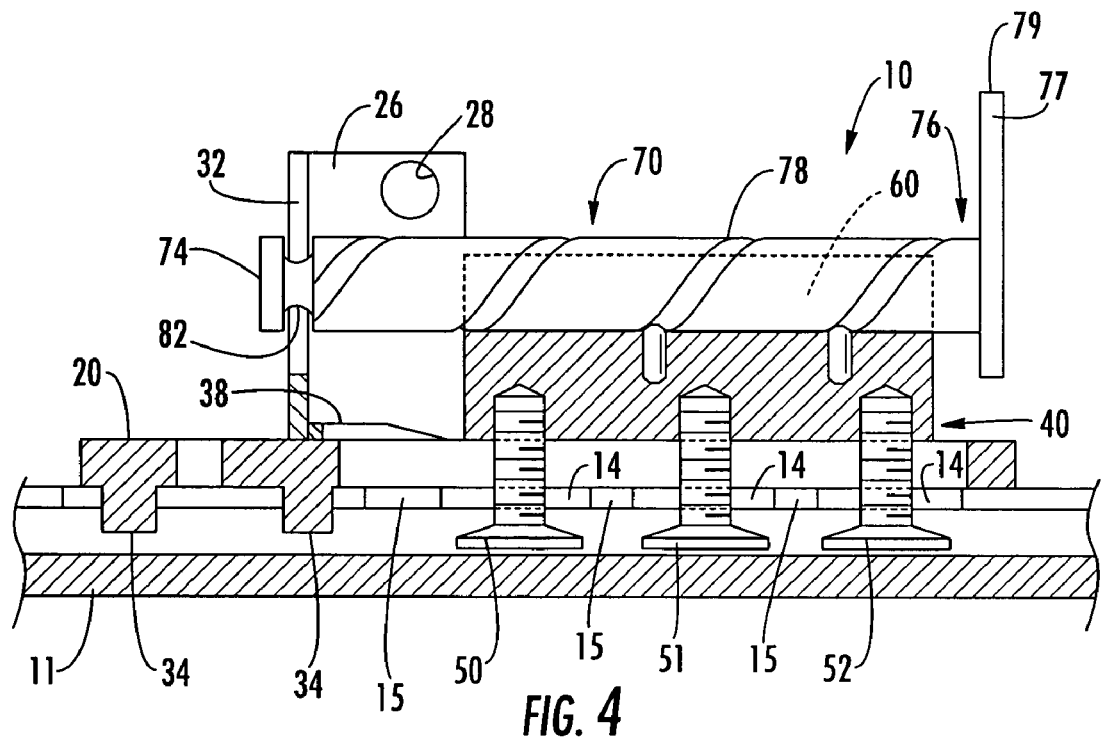
FIG. 4 is a side cross-section view of the track fastener assembly of FIG. 2 disposed in a track in an installation and removal position.
Figure 5:
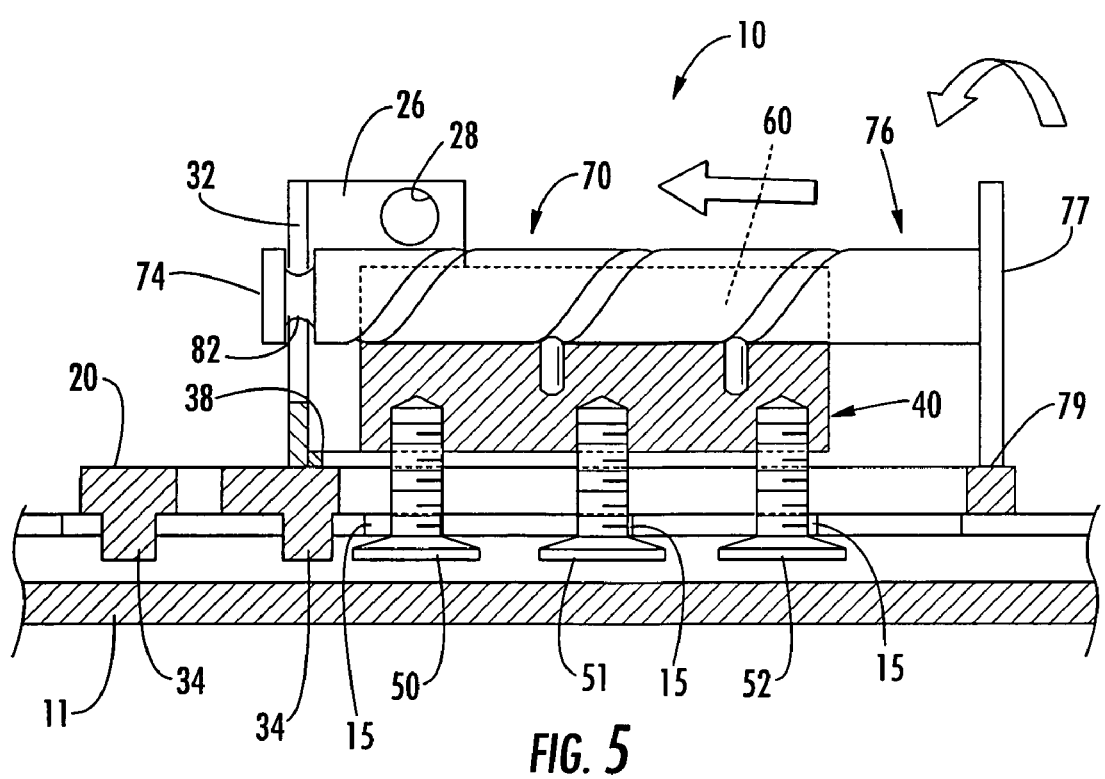
FIG. 5 is a side cross-section view of the track fastener assembly of FIG. 2 disposed in locked position.
Figure 6:
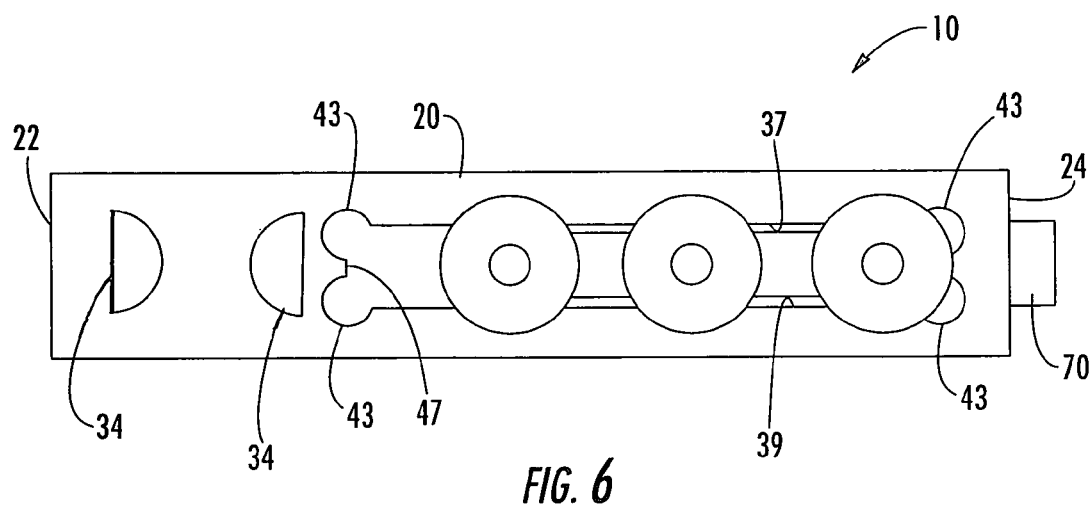
FIG. 6 is a bottom view of a track fastener assembly according to one embodiment of the invention.
Figure 7:
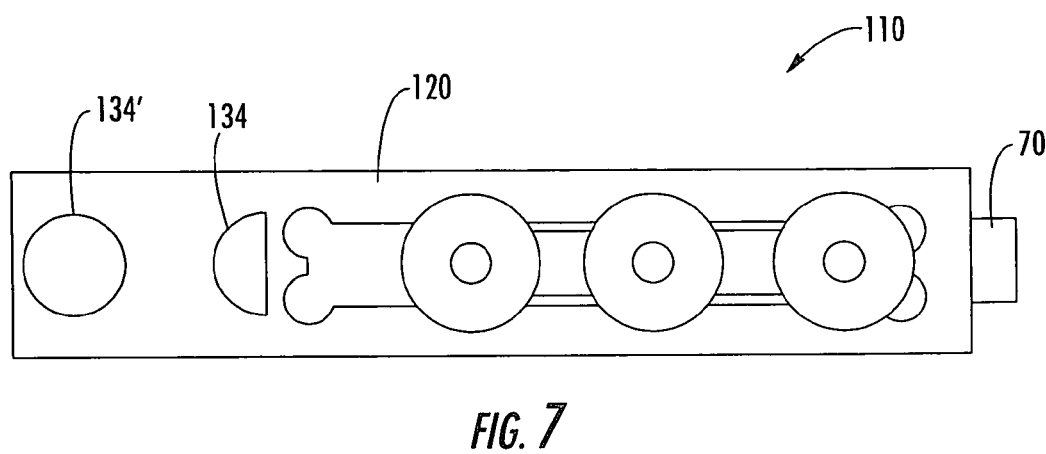
FIG. 7 is a bottom view of a track fastener assembly showing an alternative arrangement of a track stop.

One or more track stops 34 protrude from the bottom surface of the base 20 (see FIGS. 3, 4, and 5). These track stops 34 are received in the enlarged openings 14 of the track 11 to prevent longitudinal and lateral motion of the base relative to the track 11, as described in more detail below. In the example shown in FIGS. 3–6, the track stops 34 take the form of semi-cylindrical protrusions. However, any other shape which will fit into the enlarged openings may be used. For example, FIG. 7 shows a bottom view of an alterative embodiment of a track fastener assembly 110 having a base 120 with a semi-cylindrical track stop 134 and a fully cylindrical track stop 134'.

An axially-extending longitudinal slot 36 is formed through the base 20. The longitudinal slot 36 has sidewalls 37 and 39 which are tapered outwardly from top to bottom, and includes a beveled ledge 41 around its upper surface (see FIG. 8). The longitudinal slot 36 may have rectangular or radiused ends. However, in the illustrated example (see FIGS. 6 and 7), each of the slot ends have a "dog-bone" shape comprising a pair of relief cuts 43 which define a central pad 47 therebetween. A portion of the upper surface 21 of the base 20 on each side of the longitudinal slot 36 and between the bosses 26 is raised so as to define a ramp 38. A slide 40 is disposed in the longitudinal slot 36 of the base 20. The slide 40 is a unitary, elongated component having a forward end 42 and an aft end 44.

Figure 8:
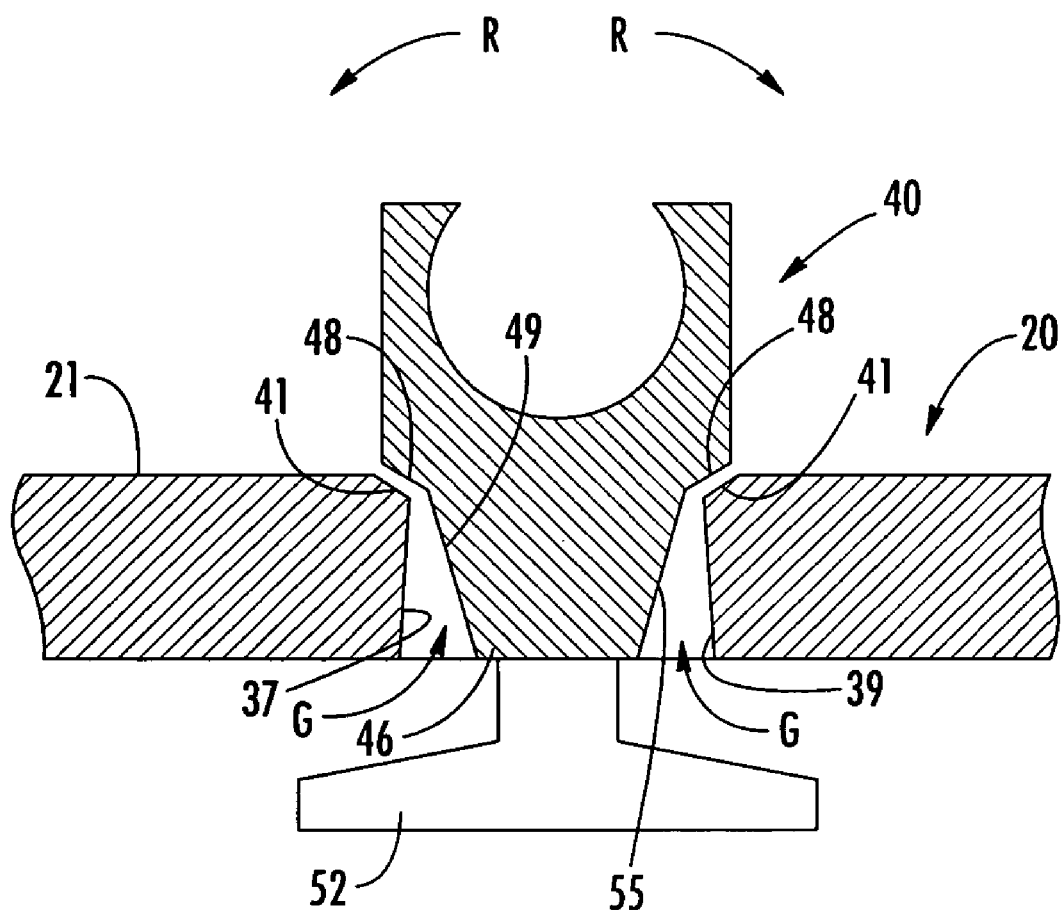
FIG. 8 is a partial cross-sectional end view of a track fastener assembly.

Referring to FIG. 8, the lower portion of the slide 40 is formed into an elongated rail 46 having tapered surfaces 49 and 55. The rail 46 is flanked at its upper end by a pair of angled, laterally extending shoulders 48. The rail 46 and the longitudinal slot 36 mate in such a way that the shoulders 48 of the slide 40 are roughly parallel to the beveled ledge 41 of the longitudinal slot 36, but the tapered surfaces of the rail 46 and the sidewalls 37 and 39 of the longitudinal slot 36 define an opposing taper, which creates a gap "G" on either side of the rail 46. The effect is to allow a constrained form of rotation about the approximate center of the locking rod 70, as depicted by the arrows "R". In the illustrated example about 10° of rotation is allowed. This rotation accommodates the seat track warpage that occurs during an accident and which is required to be simulated during 16 g crash testing, so that the seats can deflect under crash loads without failing. One or more threaded holes (not shown) are formed in the bottom of the rail 46. These holes receive locking studs 50, 51 and 52, shown in FIG. 3. These locking studs 50, 51, 52 are a known type, each including a threaded shaft 54 and a circular mushroom head 56.

Referring to FIGS. 3, 4, and 5, the upper portion of the slide 40 has a concave, circular profile channel 60 formed therein. The slide 40 forms a pair of walls 64 with overhanging lips 68 which retain a locking rod 70 therein. One or more pins 72 are disposed in the upper surface of the channel 60 and serve to engage the locking rod 70.

The locking rod 70 is generally cylindrical with forward and aft ends 74 and 76. A steeply pitched helical groove 78 is formed in the outer surface of the locking rod 70. The term "helical" is used herein to mean that the channel has a simultaneous radial and longitudinal direction, without necessarily implying a "helix" shape in a purely geometrical sense. An annular groove 82 is formed in the locking rod 70 near its forward end 74 for the purpose of engaging the vertical slot 32 of the base 20, best shown in FIG. 3. The entire track fastener assembly 10, including all of the described component parts, may be constructed of any suitable material which will withstand the expected loads during use. In the illustrated example the track fastener assembly 10 is constructed of machined aluminum, except for the locking studs 50, 51, and 52 which comprise a steel alloy.

A locking disk 77 may be attached to the aft end 76 of the locking rod 70. As shown in FIG. 2, the locking disk 77 is generally circular in shape and includes a locking flat 79. The locking disk 77 is mounted to the locking rod 70 in an eccentric, upward-offset position. A tool recess 80 is formed in locking disk. The tool recess 80 is appropriately shaped to receive a tool for turning the locking rod 70. and the locking disk 77. For example, it may be a hexagonal shape for receiving a specialized Allen-type wrench.

The track fitting apparatus 10 fits together as follows. The locking rod 70 is installed into the slide 40 so that the pins 72 engage the helical groove 78. The locking rod 70 passes longitudinally under the overhanging lips 68 and is thus retained in the channel 60. The locking rod 70 and slide 40 combination is placed vertically downward into the base 20 so that the rail 46 fits down into the longitudinal slot 36 of the base 20, and the annular groove 82 in the forward end 74 of the locking rod 70 slides down into the vertical slot 32 between the flanges 30 of the bosses 26. The locking studs 50, 51, and 52 are screwed into the slide 40 from below. Thus assembled, the locking rod 70 may rotate and move a limited amount vertically with respect to the base 20, limited by the interference of the locking studs with the base 20, but may not move laterally or longitudinally to any substantial degree relative to the base 20. Rotation of the locking rod 70 will thus cause the slide 40 to move forwards or backwards axially in the longitudinal slot 36, depending on the direction of rotation.

FIG. 4 illustrates the installation of track fastener assembly 10 in the locking track 11. It is noted that the cutting plane of the cross-sectional views of FIGS. 4 and 5 is offset from the true centerline of the track fastener assembly 10 so as to better show the operation of the locking rod 70 and slide 40. The track fastener assembly 10 (and any attached seating or cargo unit) is placed vertically downwards so that the locking studs 50, 51, and 52 pass through three adjacent enlarged openings 14 in locking track 11. In this position, the track fastener assembly 10 may be removed from the locking track 11 by simply lifting the track fastener assembly 10 vertically out of the track 11. Locking studs 50, 51, and 52 are aligned with enlarged openings 14. The track stops 34 are engaged in one or more of the enlarged openings 14 and prevent lateral or longitudinal movement of the track fastener assembly 10 relative to the locking track 11. The locking disk 77 is oriented so that the locking flat 79 faces upward, away from the base 20. Referring now to FIG. 5, the track fastener assembly 10 is locked into place as follows: While the track fastener assembly 10 is still positioned in the original location along the track 11, the locking rod 70 is rotated (clockwise in this example), using a suitable tool, such as an Allen-type wrench, not shown, engaged in the tool recess 80. As the locking rod 70 is turned, the helical groove 78 forces the pins 72, and thus the slide 40 with the attached locking studs 50, 51, and 52 to translate along the length of the base 20 towards the track stops 34, while the base 20 remains stationary. This motion is constrained laterally by the rail 46 of the slide 40 riding in the longitudinal slot 36 of the base 20. This longitudinal motion of the slide 40 causes the attached locking studs 50, 51, and 52 to move to a position under respective adjacent narrow track slot segments 15. This prevents the withdrawal of the track fastener assembly 10 from the track 11 in a vertical direction.

At the same time, the shoulders 48 of the slide 40 engage the ramp 38 of the base 20. This forces the slide 40 upward, causing the locking studs 50, 51, and 52 to pull the base 20 down against the top surface of the track 11. Further rotation of the locking rod 70 causes the upper walls 13 of the track 11 to be tightly clamped between the locking studs 50, 51, and 52 and the base 20 such that the track fitting apparatus 10 is rigidly attached to the track 11. As the locking rod 70 and locking disk 77 are rotated, the peripheral edge of the locking disk 77 bears against the base 20, creating a camming motion which lifts up the aft end 76 of the locking rod 70 and brings the slide 40 into a level (or nearly level) position relative to the base 20. As the locking disk 77 is rotated to the fully locked position, the locking flat 79 engages the surface of the base 20. In this position, the locking disk 77 serves to resist rotation from the locked position, and visually indicate that the track fastener assembly 10 is locked.

The axial motion of the slide 40 is limited by the rail 46 abutting the central pad 47 of the longitudinal slot 36 of the base 20. By limiting the axial motion in this manner, any galling or gouging of the walls of the longitudinal slot 36 by the corners of the rail 46 is prevented. Thus, the seat or cargo unit is securely locked in place, without having to move the track fastener assembly 10 relative to the track 11 once the initial positioning has been completed.

The track fastener assembly 10 can be moved from the installation (or unlocked) position to the locked position with a small amount of rotation, for example about 360 or 270 degrees, and preferably only about 180 degrees. It has been determined that a helical groove 78 having a pitch sufficient to provide fully opened to fully locked movement within approximately 180 degrees of rotation, in conjunction with the proper location of the locking flat 79 of the locking disk 77 provides a proper balance of torque required to rotate the locking rod 70 and the number of turns between the locked and unlocked positions. Other configurations are possible for the helical groove 78. In addition, the number and spacing of the locking studs may be varied. Furthermore, it is equally possible that the moving components of the track fastener assembly 10 could be reversed. That is, the locking rod could be axially immovable relative to the slide 40 and axially movable relative to the base 20.

A track fastener assembly is described above. Various details of the invention may be changed without departing from its scope. Furthermore, the foregoing description of the preferred embodiment the invention and the best mode for practicing the invention are provided for the purpose of illustration only and not for the purpose of limitation—the invention being defined by the claims.

What is claimed is:

1. A track fastener assembly for use with a locking track of the type used to secure a seat or cargo apparatus to the floor of a vehicle, upper walls of said locking track defining a longitudinally-extending slot therein, upper walls of the slot having regularly spaced-apart enlarged openings along the length thereof separated by relatively narrower track segments defining locking segments, said track fastener assembly comprising:
   (a) an elongated base having forward and aft ends and including attachment means for attachment to a seat or cargo apparatus, said base having a longitudinal slot formed therein, at least one ramp disposed on an upper surface of said base adjacent a forward end of said longitudinal slot, and at least one downwardly-protruding track stop for engaging said enlarged openings of said track;
   (c) a slide movably attached to said base, said slide including a rail received in said longitudinal slot of said base with at least one locking stud attached thereto; and
   (e) a generally horizontally extending locking rod having a helical groove formed in its outer surface, said locking rod being operatively connected to said base and said slide, such that rotation of said locking rod causes said slide and said at least one attached locking stud to move longitudinally from an installation position near said aft end of said base to a locked position spaced away from said aft end of said base, wherein said slide is displaced upwardly by said ramp in said locked position.

2. A track fastener assembly according to claim 1, wherein said slide includes at least one pin which engages said helical groove of said locking rod for imparting horizontal movement to said slide as said locking rod is rotated.

3. A track fastener assembly according to claim 1 whereby said locking rod may freely rotate and move vertically with respect to said base, but is restrained laterally and longitudinally relative to said base.

4. A track fastener assembly according to claim 1, wherein said helical groove is formed in said locking rod to move said slide between said installation position and said locked position in less than 360 degrees of rotation of said locking pin.

5. A track fastener assembly according to claim 1, further comprising an eccentric locking disk attached to said locking rod, such that rotation of said locking rod causes a peripheral edge of said disk to bear against said base and lift said locking rod and slide away from said base.

6. A track fastener assembly according to claim 5, wherein said locking disk includes a locking flat disposed on said peripheral edge for engaging a surface of said base, such that rotation of said locking rod is resisted when said locking disk is in said locked position.

7. A track fastener assembly according to claim 6, wherein said locking flat is positioned such that said locking flat engages said base after approximately 180 degrees of rotation of said locking rod from said installation position.

8. A track fastener assembly according to claim 1, wherein said helical groove is formed in said locking rod to move said slide between said installation position and said locked position in approximately 180 degrees of rotation of said locking rod.

9. A track fastener assembly according to claim 1, wherein:
said rail includes a pair of tapered surfaces flanked by a pair of angled shoulders; and
said longitudinal slot includes a pair of sidewalls tapered opposite to said tapered surfaces, and a beveled ledge;
wherein said angled shoulders mate with said beveled ledge, and a gap is formed between said tapered surfaces and said sidewalls, so as to permit limited rotation of said slide relative to said base.

10. A track fastener assembly for use with a locking track of the type used to secure a seat or cargo apparatus to the floor of a vehicle, upper walls of said locking track defining a longitudinally-extending slot therein, upper walls of the slot having regularly spaced-apart enlarged openings along the length thereof separated by relatively narrower track segments defining locking segments, said track fastener assembly comprising:
(a) an elongated base having forward and aft ends and including attachment means for attachment to a seat or cargo apparatus, said base having a longitudinal slot formed therein, at least one ramp disposed on an upper surface of said base adjacent a forward end of said longitudinal slot, and at least one downwardly-protruding track stop for engaging said enlarged openings of said track;
(b) a slide movably attached to said base, said slide including a bottom portion defining a rail which is received in said longitudinal slot of said base, a pair of shoulders adjacent said rail, and an upper surface defining a channel;
(c) at least one upstanding pin disposed in said channel;
(d) at least one locking stud having an enlarged head attached to said rail of said slide; and
(f) a locking rod having forward and aft ends and a helical groove formed in its outer surface, said locking rod being received in said channel such that said helical groove engages said pin, said forward end of said locking rod being rotatably attached to said base;
wherein rotation of said locking rod causes said slide and said at least one attached locking stud to move axially along said longitudinal slot from an installation position near said aft end of said base to a locked position spaced away from said aft end of said base, and wherein said shoulders of said slide engage said ramp thereby deflecting said slide upwards in said locked position.

11. A track fastener assembly according to claim 10, wherein said locking rod includes a tool recess formed in said rod aft end for engaging a tool for rotating said locking rod.

12. A track fastener according to claim 10 wherein said track stop comprises a cylindrical protrusion.

13. A track fastener according to claim 10 wherein said track stop comprises a semi-cylindrical protrusion.

14. A track fastener assembly according to claim 10, wherein said helical groove is formed in said locking rod to move said slide between said installation position and said locked position in less than 360 degrees of rotation of said locking rod.

15. A track fastener assembly according to claim 10, further comprising an eccentric locking disk attached to said locking rod, such that rotation of said locking rod causes a peripheral edge of said disk to bear against said base and lift said locking rod and slide away from said base.

16. A track fastener assembly according to claim 15, wherein said locking disk includes a locking flat disposed on said peripheral edge for engaging a surface of said base, such that rotation of said locking rod is resisted when said locking disk is in said locked position.

17. A track fastener assembly according to claim 16, wherein said locking flat is positioned such that said locking flat engages said base after approximately 180 degrees of rotation of said locking rod from said installation position.

18. A track fastener assembly according to claim 10, wherein said helical groove is formed in said locking rod to move said slide between said installation position and said locked position in approximately 180 degrees of rotation of said locking rod.

19. A track fastener assembly according to claim 10, wherein:
said rail includes a pair of tapered surfaces flanked said shoulders; and
said longitudinal slot includes a pair of sidewalls tapered opposite to said tapered surfaces, and a beveled ledge;
wherein said shoulders mate with said beveled ledge, and a gap is formed between said tapered surfaces and said sidewalls, so as to permit limited rotation of said slide relative to said base.

20. A track fastener assembly according to claim 10, wherein said attachment means comprise a pair of upstanding spaced-apart bosses having a pair of concentric holes formed therein, said bosses include a pair of flanges defining a vertical slot therebetween.

21. A track fastener assembly according to claim 20, wherein said locking rod has an annular groove formed at its forward end, said annular groove being received in said vertical slot between said bosses whereby said locking rod may freely rotate and move vertically with respect to said base, but is restrained laterally and longitudinally relative to said base.

* * * * *

UNITED STATES PATENT AND TRADEMARK OFFICE
CERTIFICATE OF CORRECTION

PATENT NO. : 6,902,365 B1
DATED : June 7, 2005
INVENTOR(S) : Dowty, Mark Brian

It is certified that error appears in the above-identified patent and that said Letters Patent is hereby corrected as shown below:

Column 8,
Line 31, delete "(c)" and enter -- (b) --.
Line 34, delete "(e)" and enter -- (c) --.

Signed and Sealed this

Sixteenth Day of August, 2005

JON W. DUDAS
*Director of the United States Patent and Trademark Office*